United States Patent [19]

Nakajima

[11] Patent Number: 5,331,506
[45] Date of Patent: Jul. 19, 1994

[54] ELECTRONIC APPARATUS WHEREIN COMPONENTS ARE DETACHABLY ARRANGED IN A HOUSING HAVING A RECESS WITH A SLIDING AND CLAMPING COVER

[75] Inventor: Yuji Nakajima, Tokyo, Japan

[73] Assignee: Kabushiki Kaisha Toshiba, Kawasaki, Japan

[21] Appl. No.: 950,645

[22] Filed: Sep. 23, 1992

[30] Foreign Application Priority Data

Oct. 11, 1991 [JP] Japan .................................. 3-263723

[51] Int. Cl.[5] .......................... H05K 5/03; H05K 7/14; H02J 7/04; G06F 1/16
[52] U.S. Cl. .................................... 361/683; 361/727; 361/686; 320/35
[58] Field of Search .............................. 220/345, 346; 248/917-923; 364/708, 708.1; 312/223.2, 293.3; 429/96-100; 361/380, 390-395, 399, 679-686, 724-727; 320/35, 36, 54

[56] References Cited

U.S. PATENT DOCUMENTS

| | | | |
|---|---|---|---|
| 4,781,422 | 11/1988 | Kimble | 312/223.2 X |
| 4,864,523 | 9/1989 | Sasaki | 364/708 |
| 4,991,225 | 2/1991 | Holcomb et al. | 429/100 X |
| 5,142,446 | 8/1992 | Tanaka et al. | 361/393 |

FOREIGN PATENT DOCUMENTS

7529370U1  1/1976  Fed. Rep. of Germany .

Primary Examiner—Leo P. Picard
Assistant Examiner—Michael W. Phillips
Attorney, Agent, or Firm—Limbach & Limbach

[57] ABSTRACT

Disclosed herein is an electronic apparatus having a keyboard and a display unit and having a base unit made of a synthetic resin. The base unit comprises an upper case having a top wall and a peripheral wall, and a lower case having a bottom wall and a peripheral wall. The peripheral walls of the upper and lower cases are connected. A storage space is formed between the upper case and the lower case, for containing a battery pack. A loading port is formed in the sides of the upper and lower cases, communicating with said storage space. Though this port, the battery pack can be inserted into, and removed from, the storage space. A cover is connected to the base unit. It can move between a port-closing position where it closes the loading port and a second port-opening position where it opens the loading port. The cover has a top wall slidably mounted on the top wall of the upper case, and a lower wall slidably mounted on the bottom wall of the lower case. A temperature sensor is also provided for detecting the battery temperature and a temperature fuse is provided.

27 Claims, 12 Drawing Sheets

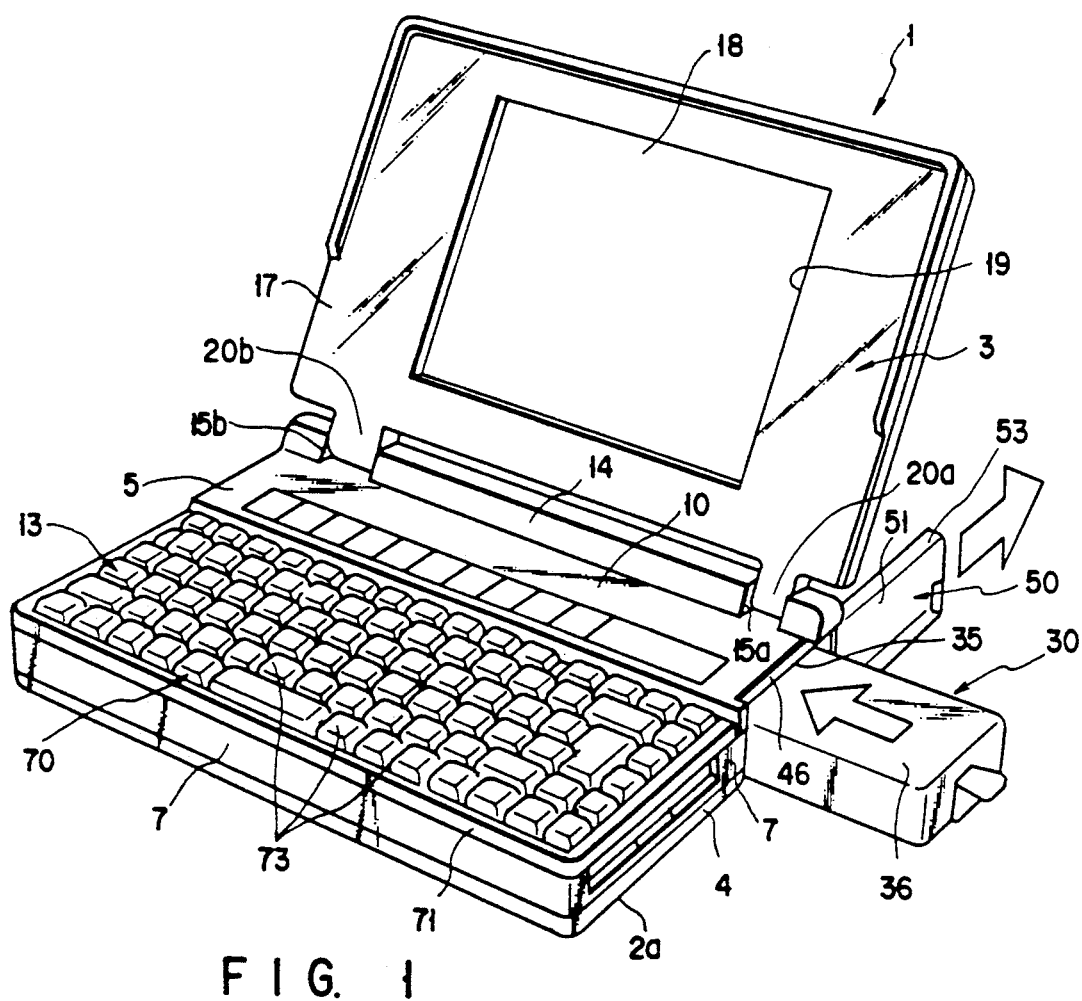
F I G. 1

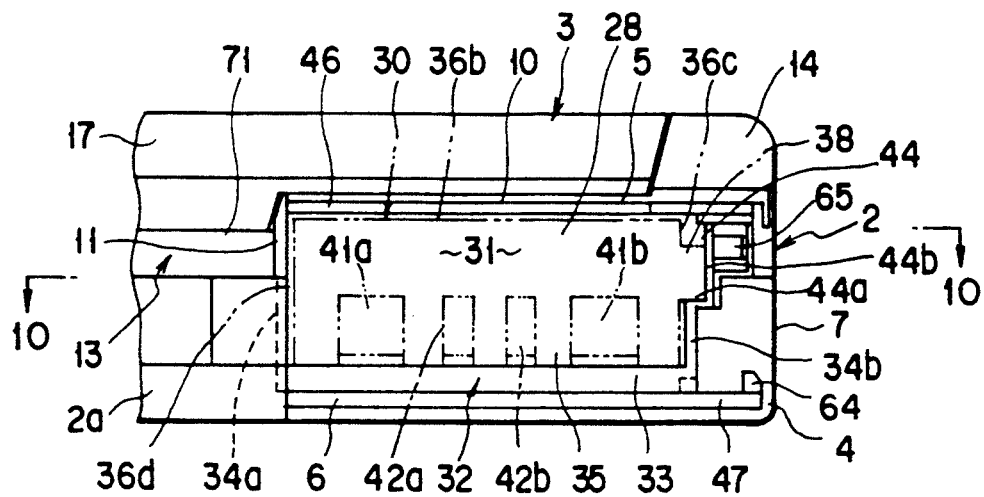
F I G. 9
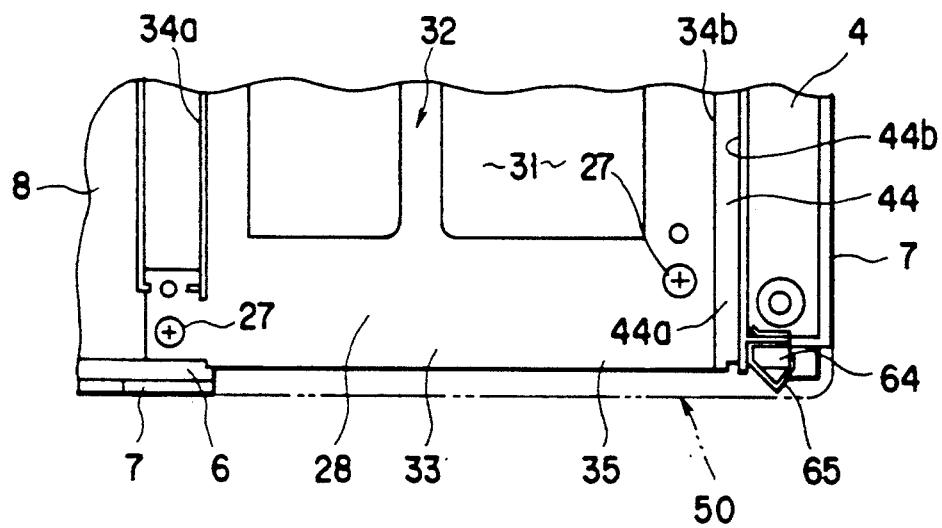
F I G. 10

ELECTRONIC APPARATUS WHEREIN COMPONENTS ARE DETACHABLY ARRANGED IN A HOUSING HAVING A RECESS WITH A SLIDING AND CLAMPING COVER

BACKGROUND OF THE INVENTION

1. Field of the Invention

This invention relates to an electronic apparatus such as a book-sized personal computer or word processor and, more particularly, it relates to a base unit to be used for such an electronic apparatus comprising a battery pack for storing a drive power source and a keyboard.

2. Description of the Related Art Various book-sized or so-called lap-top personal computers comprising a flat and box-shaped base unit and a keyboard and a flat panel-type display unit arranged on said base unit are currently available.

Computers of the above described type are normally provided with a rechargeable battery pack for storing a drive power source so that they may be used at locations where the commercial power supply is not available. Since such a battery pack needs to be replaced by a new one when the battery pack contained there has lost its life after a long use, it is normally removably fitted to the base unit. In other words, the base unit of a conventional computer of the type under consideration is provided with a storage space for containing a battery pack. Such a storage space is located adjacent to and in communication with a loading port disposed on a lateral side of the base unit, through which the battery pack is pushed into and taken out of the storage space.

The loading port is normally closed by a cover. The cover is fitted to the base unit in such a manner that it is slidable between a closed position for closing the loading port and an open position for exposing the aperture. When the cover is in the closed position, its outer surface is found on the plane of the outer surface of the lateral side wall of the base unit on which the loading port is located to form a continuous plane so that the cover constitutes part of the side wall.

The base unit contains in it functional components such as printed-circuit board carrying various circuit components thereon and floppy disc drive device. So, the base unit is normally divided into two sections; an upper case and a lower case. In the base unit comprising the upper case and the lower case, the loading port extends from a lateral side of the upper case to the corresponding lateral side of the lower case and the cover for closing and exposing the port is slidable between the upper case and the lower case.

The walls of both the upper case and the lower case are made very thin to maximize the inner spaces of the cases sometimes at the cost of the rigidity of the top wall of the upper case and the bottom wall of the lower case having a relatively large surface area. Since the top wall of the upper case is used to support a display unit which is hinged to the upper case, any force applied to the display unit to open or close it is transmitted to the top wall of the upper case, which then can be deflected because of the lack of sufficient rigidity. Additionally, since the battery pack normally weighs more than one kilogram, the bottom wall of the lower case can also be deflected when the battery pack is loaded in the storage area of the lower case.

A base unit having deflected walls of the upper and lower cases can significantly lose its esthetic and hence commercial value. Besides, the loading port can vary its vertical dimension depending on the deflection of the top and bottom walls of the upper and lower cases, resulting in malfunctions such as a totally removed cover or an unmovable cover.

SUMMARY OF THE INVENTION

In view of these circumstances, it is, therefore, a first object of the present invention to provide an electronic apparatus that is free from any deflection of the walls of the upper and lower cases and hence an unintentionally removed cover and allows the cover to be smoothly moved for closing and exposing the battery pack loading port.

A second object of the present invention is to provide an electronic apparatus that allows the loading of a battery pack only when the latter is correctly introduced into the apparatus.

A third object of the present invention is to provide an electronic apparatus that can effectively cool its heat emitting circuit parts without using any particular cooling system such as a fan, simplifying the internal configuration of the base unit and enhancing the reliability of its cooling ability.

According to the present invention, the above first object of the invention are achieved by providing an electronic apparatus comprising a box-shaped base unit made of a synthetic resin and having an upper case having a top wall and a peripheral wall continuous to the top wall, a lower case having a bottom wall and a peripheral wall continuous to the bottom wall, and a storage space between said upper case and the lower case, the peripheral walls of the upper case and lower case having a loading port communicating with the storage space; a component removably stored in the storage space through the loading port; and a cover connected to the base unit and capable of moving between a port-closing position where the cover closes the loading port and a second port-opening position where the cover opens said loading port, the cover having a top wall slidably mounted o the top wall of the upper case and a lower wall slidably mounted on the bottom wall of the case.

With such an arrangement, the top wall of the upper case and the bottom wall of the lower case can be coupled together by means of the cover. Therefore, if the top wall of the upper case and the bottom wall of the lower case tend to deflect and move away from each other, such deflection can be suppressed by the cover at least at and near the loading aperture.

The second object of the present invention is achieved by providing an electronic apparatus comprising a housing having the walls and containing a battery storage portion which has a pair of opposing side walls; a loading port formed in one of side walls of the housing and communicating with the battery storage portion; a battery pack removably stored in the battery storage portion and removed therefrom through the loading port, and having a pair of side walls slidably contacting with and guided by the side walls of the battery storage portion, and a hollow ridge secured to one of the side walls, extending in a direction in which the battery pack is inserted into said battery storage portion, and containing circuit components; and a recess formed in one of the side walls of the battery storage portion for receiving the hollow ridge of the rectangular case when the battery pack is inserted into the battery storage portion, the recess having an opening communicating with the loading port.

With such an arrangement, when a battery pack is inserted into the battery storage portion by way of the loading port, the ridge of the battery pack interferes with the battery storage portion to block any motion of the battery pack trying to go into the battery storage portion unless the ridge is aligned and engaged with the groove of the battery storage portion. Therefore, a battery pack is allowed to enter the apparatus only when it is correctly introduced into the apparatus. Since the ridge is arranged on the battery pack for containing various circuit components no additional structural member is required for the apparatus to prevent incorrect insertion of a battery pack.

The third object of the present invention is achieved by providing an electronic apparatus comprising a box-shaped housing made of a synthetic resin and having an opening formed in a top wall; a circuit component contained in the box-shaped housing, opposing the opening, and radiating heat while operating; a keyboard device attached to the box-shaped housing to close the opening and having a metal plate exposed through the opening and opposing the circuit component; and a heat sink interposed between the metal plate and said circuit component, for absorbing the head radiated from the circuit component and transmitting the heat to the metal plate.

With such an arrangement, the heat generated by and emitted from the circuit components is transmitted to the metal plate, which in turn discharges the heat sink to the atmosphere. Therefore, while the base unit is made of synthetic resin having a low heat conductivity, it can effectively cool the heat emitting circuit components without using any particular cooling system.

Now, the present invention will be described in greater detail by referring to the accompanying drawings that illustrate preferred embodiments of the invention which are personal computers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a perspective view of an embodiment of an apparatus according to the invention, which is in fact a personal computer, showing a condition where the cover is opened to allow a battery pack to be inserted into the base unit;

FIG. 9 is a side view of the personal computer of FIG. 1, showing a portion thereof where the aperture for loading a battery pack is disposed;

FIG. 10 is a sectional view taken along line 10—10 of FIG. 9;

DETAILED DESCRIPTION OF THE PREFERRED EMBODIMENTS

Figure 2:
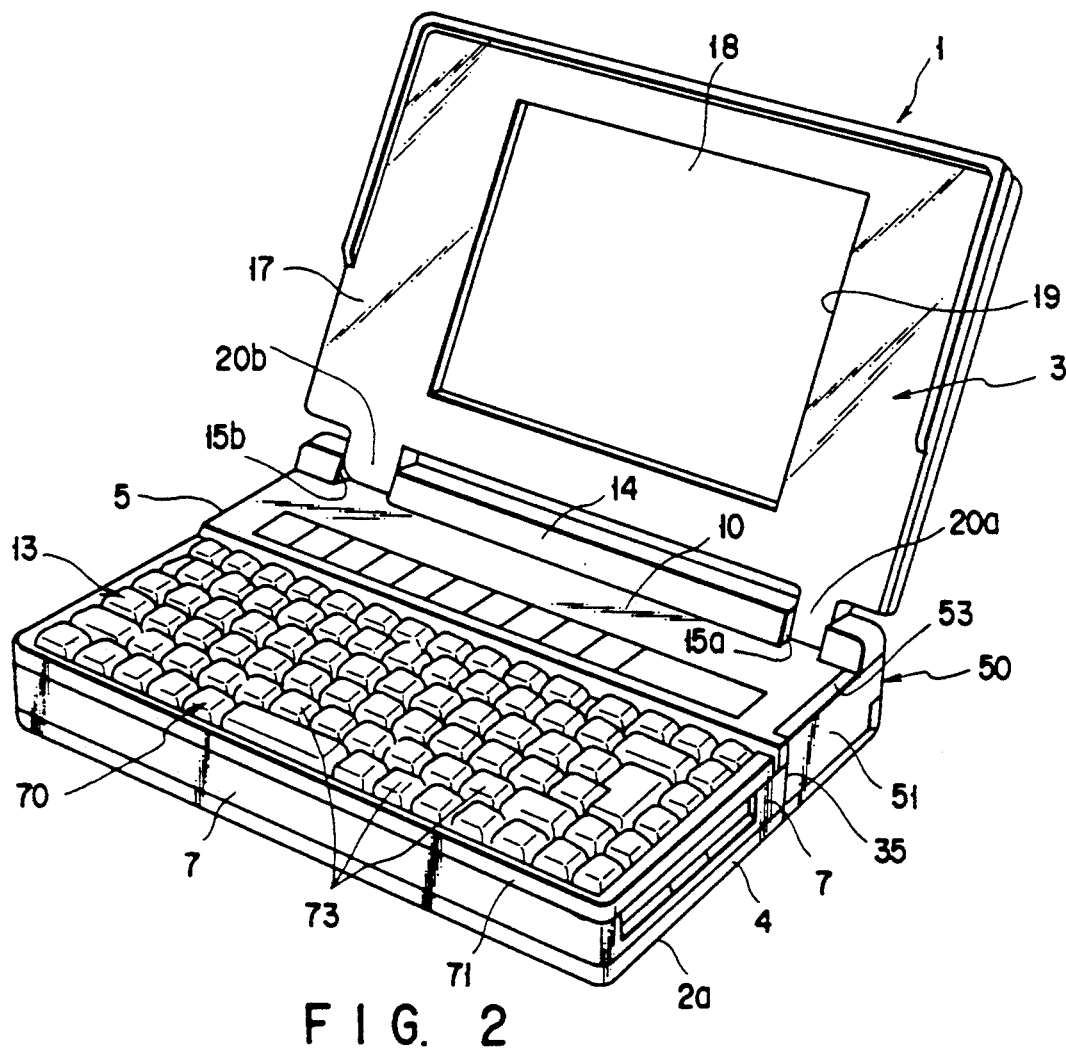
FIG. 2 is a perspective view of the personal computer of FIG. 1, showing a condition where the battery pack is completely inserted into the base unit and the cover is closed.

Referring firstly to FIG. 1 illustrating a first embodiment of the invention, which is an A-4 book-sized personal computer generally indicated by reference numeral 1. The personal computer 1 comprises a base unit 2 and a flat panel-type display unit 3.

The base unit 2 comprises a housing 2a having a rectangular plan view. The housing 2a is divided into a lower case 4 having an open top and a upper case 5 placed on the lower case 4. Both the lower case 4 and the upper case 5 are made of a synthetic resin material such as ABS resin and internally lined with a plating layer (not shown) for electromagnetically shielding the inside of the cases.

Figure 14:
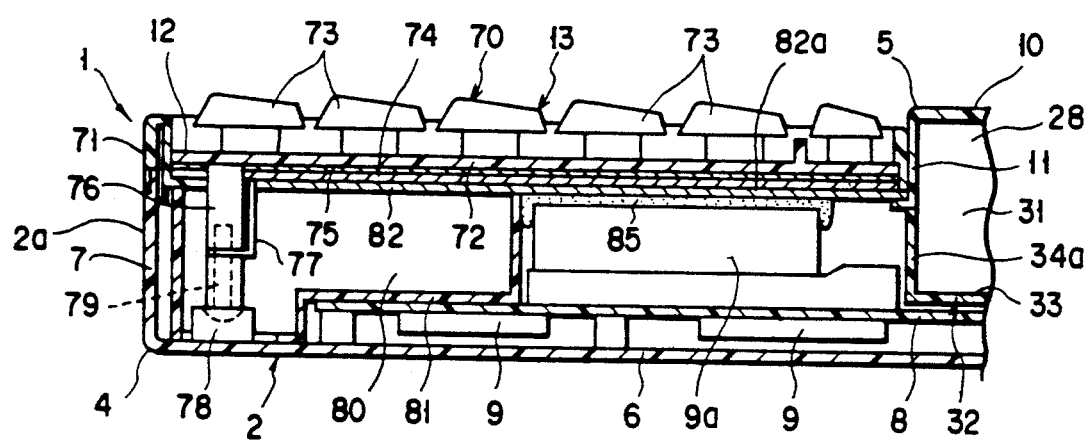
FIG. 14 is a sectional view taken along line 14—14 of FIG. 13.
Figure 15:
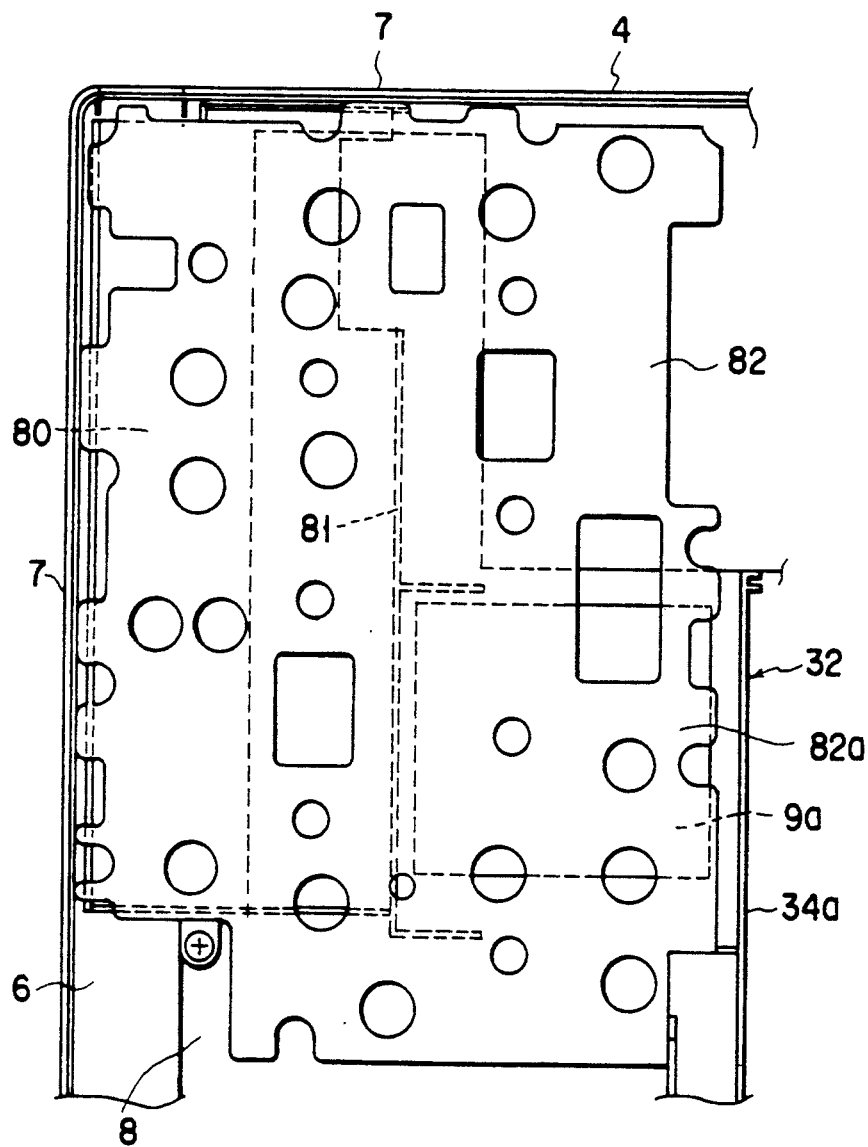
FIG. 15 is a partial plan view of the base unit of the personal computer of FIG. 13, showing the inside of the base unit as seen when the keyboard unit is removed from the base unit.

The lower case 4 comprises a bottom wall 6 that provides a bottom for the base unit 2 and side or peripheral walls 7 extending from the bottom wall 6. As shown in FIG. 14, a printed-circuit board 8 is arranged on the bottom wall 6 of the lower case 4. Various circuit components 9 including those of a power supply circuit and a charging circuit are mounted on the printed-circuit board 8, while an IC chip 9a having a large capacity which is also a circuit component and emits heat at an enhanced rate during its operation is disposed on an upper surface of the printed-circuit board 8.

As shown in FIG. 2, the upper case 5 covers a rear half of the lower case 4. The upper case 5 comprises a flat and rectangular top wall 10 that provides a ceiling for the base unit 2 and side or peripheral walls 11 extending from the top wall 10. The top wall 10 has a thickness as small as 1.4 mm or so and the side walls 11 of the upper case 5 are connected to the corresponding respective side walls 7 of the lower case 4 except the front side to respectively form continuous planes. Thus, the right, left and back side surfaces of the base unit 2 are defined by the side walls 7 and 11.

As shown in FIG. 14, a front half portion of the lower case 4 is not covered by the upper case 5 and, therefore, the top thereof is open. The opening of the lower case 4 provides a section for receiving a rectangular receiving section 12. A keyboard unit 13 is removably disposed on the receiving section 12. The keyboard unit 13 is directly connected to the upper case 5 and covers the front half portion of the lower case 4. Part of the printed-circuit board 8 and the heat emitting IC chip 9a are located below the keyboard unit 13.

As shown in FIGS. 1 through 4, the upper case 5 is provided with a display mounting portion 14 standing upward from the rear portion of the top wall 10. The display mounting portion 14 extends substantially along the entire width of the upper case 5 and connected to the top wall 10 of the upper case 5. A pair of leg receiving recesses 15a, 15b are formed near the lateral ends of the display mounting portion 14.

Figure 7:
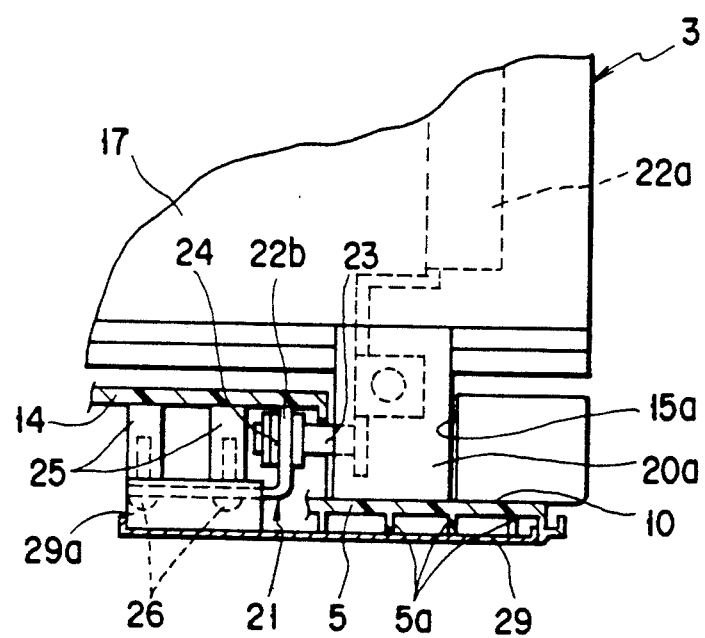
FIG. 7 is a partial section view of the embodiment of FIG. 1 showing a portion thereof where the base unit and the display unit is connected.

The display unit 3 comprises a housing 17 and a liquid crystal display 18 contained in the housing 17. The display screen of the liquid crystal display 18 is externally exposed through an opening 19 of the housing 17. The housing 17 is provided with a pair of legs 20a, 20b. The legs 20a, 20b are received by the respective leg receiving recesses 15a, 15b and rotatably coupled to the upper case 5 by means of a hinge devices 21 as shown in FIG. 7.

The hinge device 21 comprises a pair of brackets 22a, 22b and a hinge shaft 23 bridging the gap between the brackets 22a, 22b. The hinge device 21 is disposed at the leg receiving recess 15a and one end of the hinge shaft 23 is fixed to the bracket 22a, while an other end of the hinge shaft 23 is rotatably held by the bracket 22b. A wave washer 24 is disposed between the other end of the hinge shaft 23 and the bracket 22b in order to increase the frictional resistance of the bracket 22b and the hinge shaft 23 relative to each other so that the hinge shaft 23 may not freely rotate. The bracket 22a is contained in the corresponding leg 20a and the housing 17 and secured to it by a screw. The hinge shaft 23 fixed to the bracket 22a passes through the opposed surfaces of the leg 20a and the leg receiving recess 15a. The bracket 22b supporting the other end of the hinge shaft 23 is disposed within the display mounting portion 14. The display mounting portion 14 is provided on its inner surface with a plurality of bosses 25 and the bracket 22b is secured to the bosses 25 by means of screws 26.

It may be clear by now that the hinge shafts 23, provide a pair of pivots of the display unit 3 so that the display unit 3 may rotatably moved between a closed position where it completely covers the keyboard unit 13 and an open position where the liquid display 18 stands slightly behind the keyboard unit 13. When the display unit 3 is in its closed position, the housing 17 of the display unit 3 is located directly on the base unit 2 to reduce the computer 1 to a flat and box-shaped object that can be conveniently carried by hand.

Figure 5:
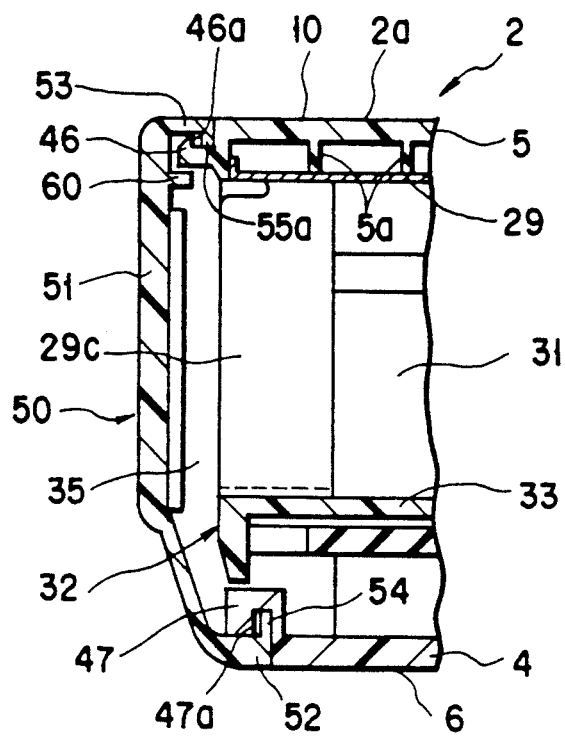
FIG. 5 is a partial sectional view of the embodiment of FIG. 1, showing a condition where the cover is fitted into the base unit.
Figure 8:
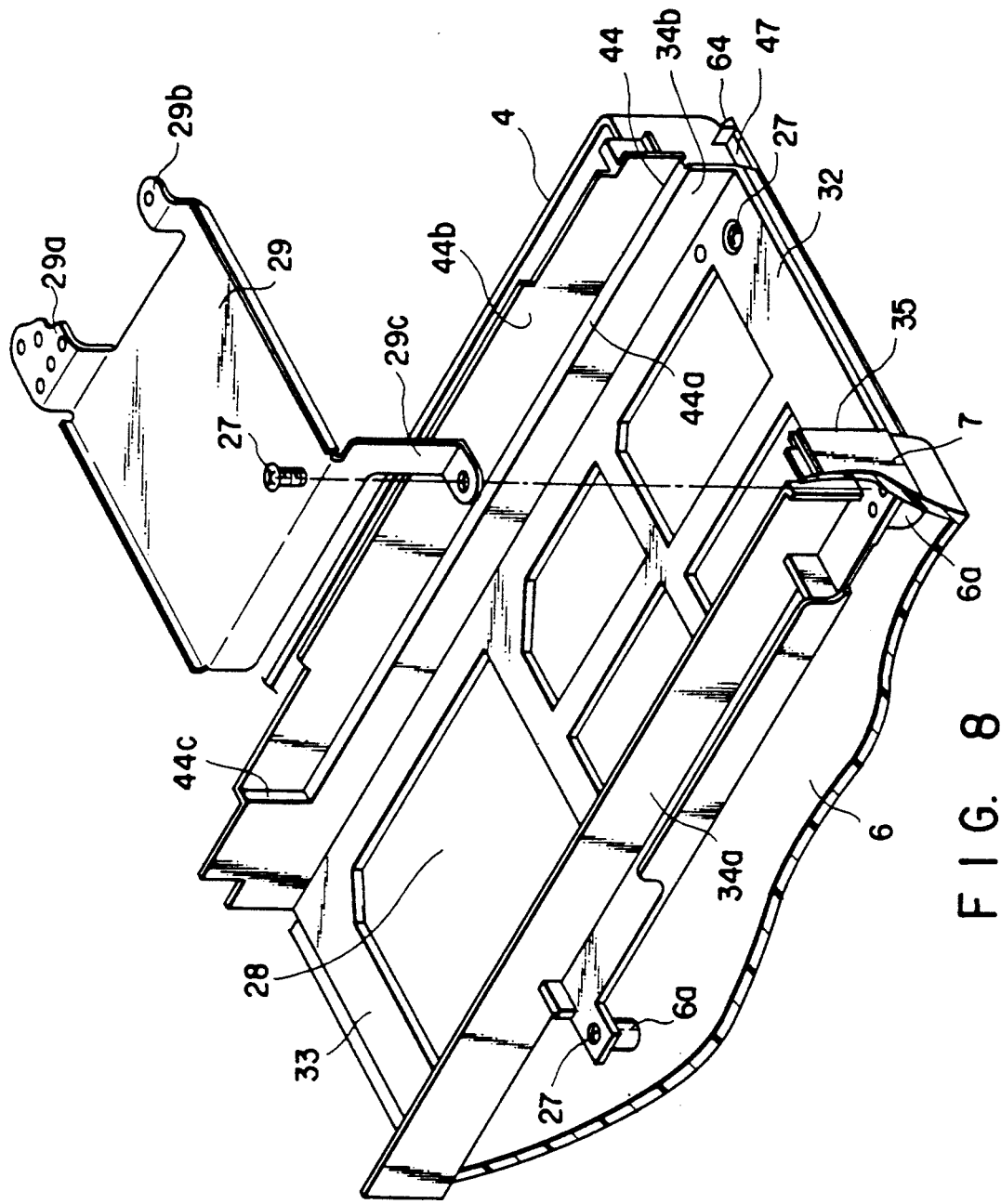
FIG. 8 is an exploded perspective partial view of the embodiment of FIG. 1, showing a condition where a battery holder is fitted to the lower case.

As shown in FIGS. 5 from 7, the upper case 5 is also provided with a large number of reinforcing ribs 5a disposed on the inner surface of its top wall 10. The ribs 5a are arranged only near the right portion of the top wall 10 and extend as far as the right leg receiving recess 15a. The top wall 10 is also provided on the inner surface near the right portion with a reinforcing metal plate 29. The plate 29 is set in contact with the tips of the ribs 5a, thereby holding the top wall 10 from within. The reinforcing metal plate 29 comprises first through third fitting legs 29a, 29b, 29c as integral parts thereof as shown in FIG. 8. The first and second fitting legs 29a, 29b are secured to the inner surface of the display mounting portion 14. The first fitting leg 29a, in particular, is rigidly secured to the bosses 25 along with the bracket 22b of the hinge device 21 as shown in FIG. 7, whereas the third fitting leg 29c is secured to a boss 6a of the bottom wall 6 by means of a screw 27 as shown in FIG. 8.

Figure 6:
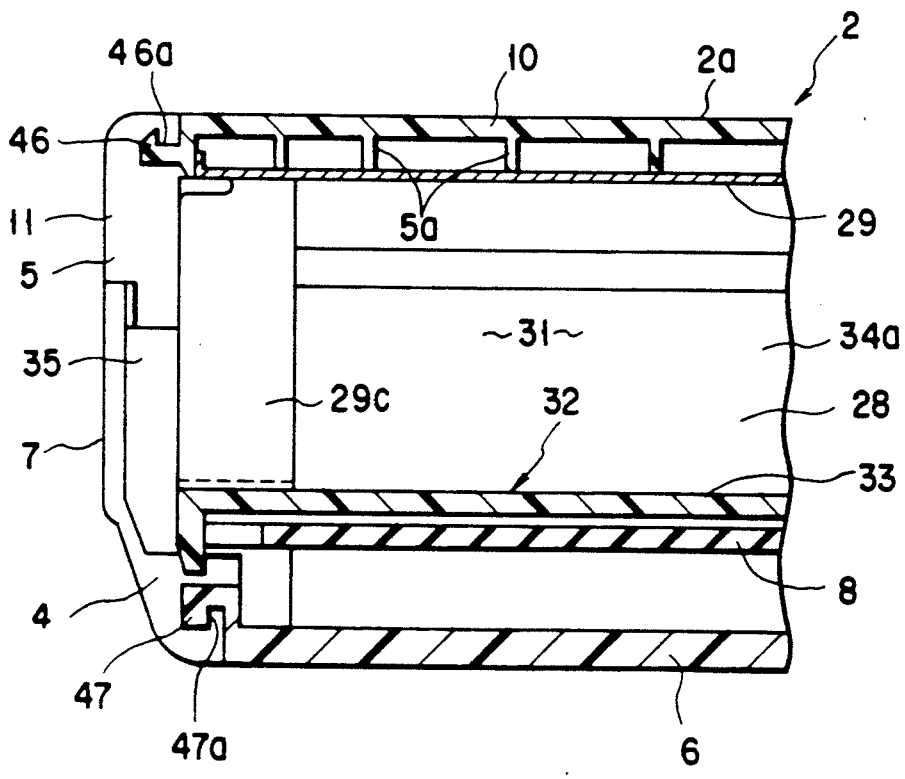
FIG. 6 is a partial sectional view of the embodiment of FIG. 1 cut through the battery pack storage area of the base unit.

The base unit 2 additionally comprises, as shown in FIGS. 6 and 9, a storage area 31 disposed between the lower case 4 and the upper case 5. The storage area 31 which extends transversely in the base unit 2 is used to accommodate a battery pack 30. The storage area 31 is in communication with a rectangular loading aperture 35 disposed at the left side wall of the base unit 2 so that a battery pack 30 may be removably loaded into the storage area 31 through the loading aperture 35. The loading aperture 35 is located adjacent to the right leg receiving recess 15a.

Figure 3:
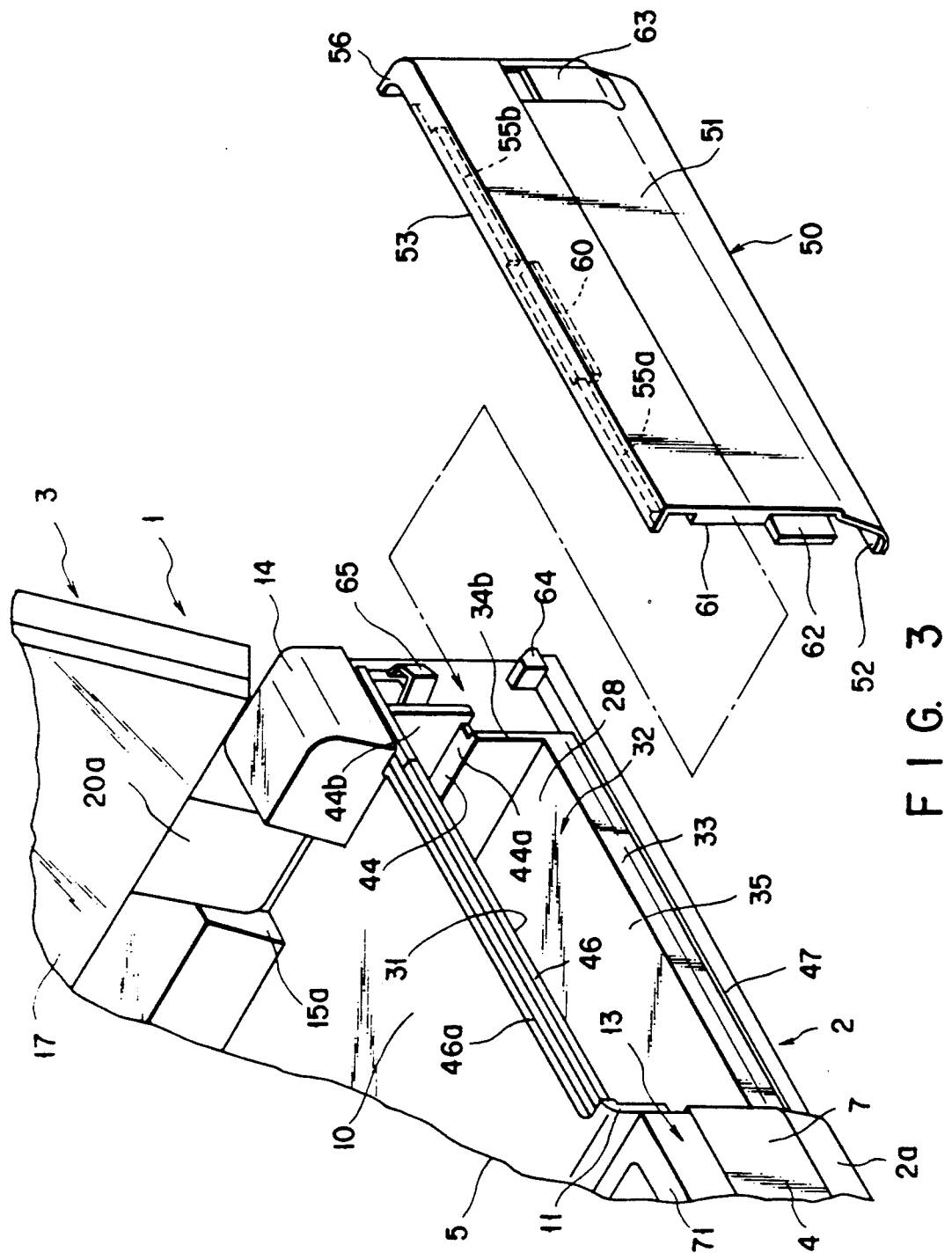
FIG. 3 is an exploded perspective partial view of the embodiment of FIG. 1, showing a portion thereof where the cover is removably fitted to the base unit.

As shown in FIGS. 2, 3 and 8, the storage area 31 is provided with a battery holder 32 made of synthetic resin. The battery holder 32 is in turn provided with a rectangular bottom plate 33 disposed above the bottom wall 6 of the lower case 4 and a pair of side plates 34a, 34b extending from the bottom plate 33. The bottom plate 33 is transversely rather oblong along the base unit 2. As shown in FIG. 8, the bottom plate 33 is secured to a boss 6a of the bottom wall 6 by means of a screw 27 as described above and the printed-circuit board 8 is disposed between the bottom plate 33 and the bottom wall 6. The side plates 34a, 34b extend substantially over the entire width of the bottom plate 33 and are disposed oppositely as they rise from the bottom plate 33.

The loading aperture 35 is defined by the edges of the bottom plate 33 and the side plates 34a, 34b located at a lateral side of the base unit 2. As shown in FIGS. 9 and 14, the side plate 34a which extends from the front edge of the bottom plate 33 is connected to the front side wall 11 of the upper case 5. The side plate 34b which stands up from the rear edge of the bottom plate 33 is located very close to the rear side of the base unit 2. As the upper edge of the side plate 34b is found close to the top wall of the upper case 5, a substantially rectangularly parallelepipedic battery storage portion 28 is defined by the battery holder 32 and the top wall 10 and the side walls 11 of the upper case 5. The battery storage portion 28 is, therefore, located behind the keyboard unit 13. The battery storage portion 28 is in communication with the loading aperture 35 and partitioned by the bottom plate 33 and the side plates 34a, 34b of the battery holder 32 within the storage area 31.

A number of positive and negative receiving terminals (not shown) connected to the power supply circuit on the printed-circuit board 8 and positive and negative connecting terminal (not shown) connected to a recharge circuit are arranged in a row on the lateral side of the battery holder 32 opposite to that of the loading aperture 35.

Figure 11:
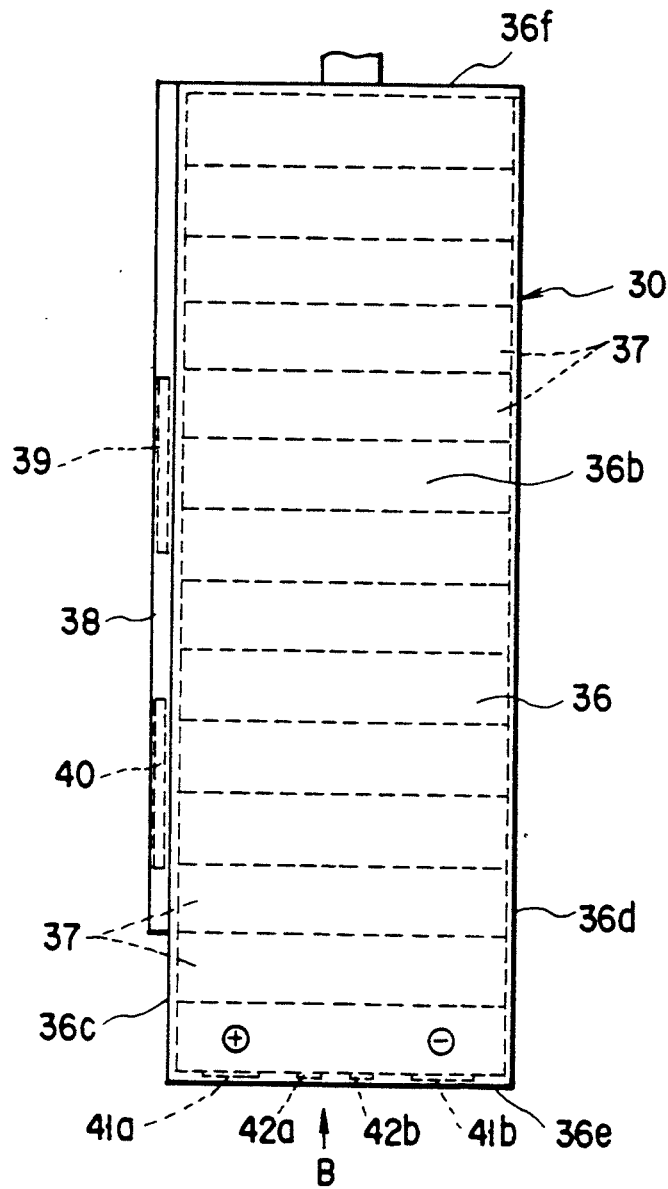
FIG. 11 is a plan view of the battery pack.
Figure 12:
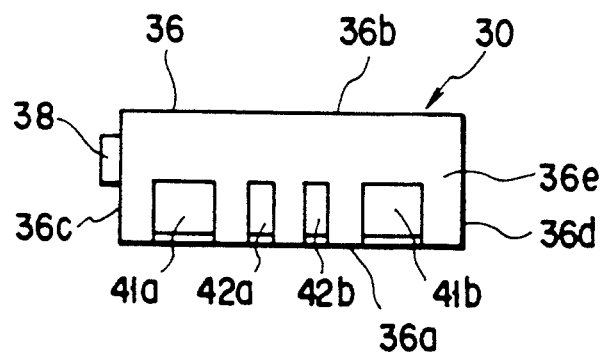
FIG. 12 is a side view of the battery pack seen from the direction of a line B of FIG. 11.

The battery pack 30 is used for the purpose of the present invention so that it may serve as the drive power source when the computer 1 is used without being connected to the commercial power supply. As shown in FIG. 11, a battery pack 30 is accompanied by a rectangularly parallelepipedic case 36, the form of which case 36 corresponds to that of the battery storage portion 28. The case 36 contains in it a number of nickel-cadmium batteries 37. As shown in FIG. 12, the case 36 comprises a flat bottom surface 36a, a flat top surface 36b, a pair of side surface 36c, 36d, and a pair of end surface 36e, 36f. When the battery pack 30 is loaded into the battery storage portion 28, the bottom surface 36a of the case 36 is placed on the bottom plate 33 of the battery holder 32. Similarly, the side surfaces 36c, 36d of the case 36 come to slidably abut the corresponding respective side plates 34a, 34d of the battery holder 32 to that the battery pack 30 may be guided by the side plates 34a, 34d. The top surface 36d of the case 36 contacts or comes close to the reinforcing metal plate 29 so that it may support the top wall 10 of the upper case 5 from inside.

As shown in FIGS. 11 and 12, a rectangular ridge 38 projects from the side surface 36c of the case 36. The ridge 38 extends straight along the side surface 36c of the case 36. A temperature sensor 39 for detecting the temperature of the battery pack 30 and closing or opening the above described recharge circuit and a temperature fuse 40 are contained within the ridge 38. An end surface of the ridge 38 is retracted from the corresponding end surface 36e of the case 36 which is the leading front end of the case 36 when it is introduced into the battery storage portion 28. A positive power supply terminal plate 41a, a negative power supply terminal plate 41b, and a pair of terminal plates 42a, 42b are arranged on the end surface 36e of the case 36. The power supply terminal plates 41a, 41b are electrically connected to the nickel-cadmium battery 37 by the temperature fuse 40. The terminal plates 42a, 42b are electrically connected to the temperature sensor 39. As shown in FIG. 12, the power supply terminal plates 41a, 41b and the terminal plates 42a, 42b are arranged in a row on the end surface 36e along the case 36. Moreover, the terminal plates 42a, 42b are located between the power supply terminal plates 41a, 41b. The power supply terminal plates 41a, 41b contact with the respective receiving terminals of the power supply circuit and the terminal plates 42a, 42b contact with the respective connecting terminals of the charging circuit when battery pack 30 is inserted into the battery storage portion 28.

As shown in FIG. 8, the side plate 34b of the battery holder 32 is provided with a recess 44 for receiving the ridge 38. The recess 44 extends along the direction of insertion of the battery pack 30. As shown in FIG. 9, the recess 44 comprises a bottom surface 44a that abuts a bottom surface of the ridge 38 and a side surface 44b that abuts a side surface of the ridge 38. As shown in FIG. 8, a stopper surface 44c is formed at the remote end of the recess 44. When the ridge 38 comes to abuts the stopper surface 44c, the ridge 38 is prevented from advancing any further so that the battery pack 30 may be set in position in the battery storage portion 28. The end of the recess 44 opposite to the stopper surface 44c is opened to the loading aperture 35.

With such an arrangement, it may be understood that the battery pack 30 can be loaded into the battery storage portion 28 through the loading aperture 35 only when the ridge 38 is correctly received in the recess 44. Otherwise, the ridge 38 interferes with the battery holder 32 and the battery pack 30 is prevented from entering the battery storage portion 28.

Figure 4:
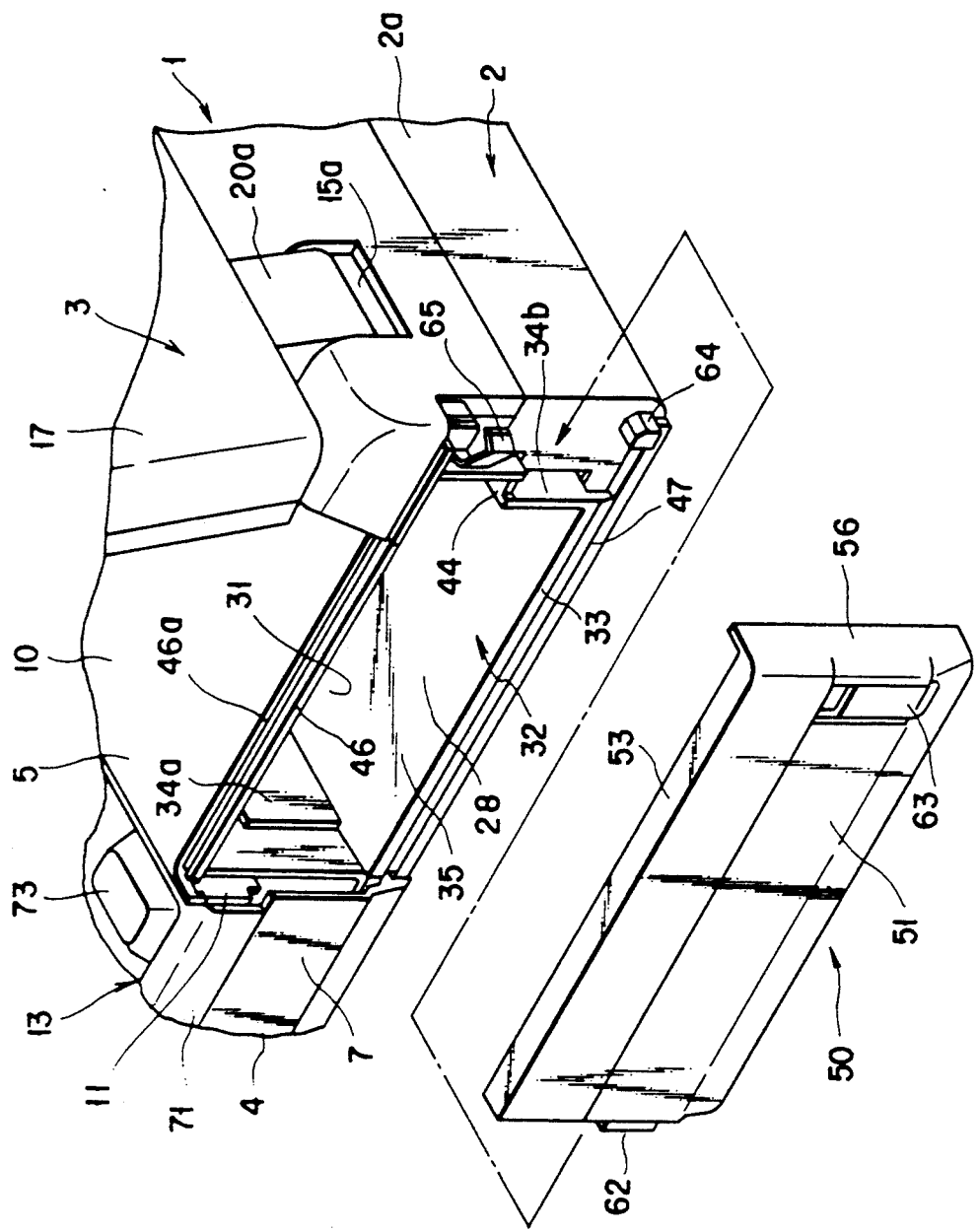
FIG. 4 is an exploded perspective partial view similar to FIG. 3 but seen from a different angle.

As illustrated in FIGS. 3 and 4, the loading port 35 extends from a lateral side wall 7 of the lower case 4 to a corresponding lateral side wall 11 of the lower case 5. The lower edge of the loading port 35 coincides with the right edge of the bottom wall 6 of the lower case 4 while the upper edge of the loading aperture 35 coincides with the right edge of the top wall 10 of the upper case 5. Moreover, the loading port 35 of this embodiment extends to the corner defined by the right lateral side surface and the rear surface of the base unit 2.

As shown in FIG. 6, the top wall 10 of the upper case 5 is provided with a first guide section 46 extending from the upper edge of the loading aperture 35. The first guide section 46 is a recess located on a level below the top wall 10. The bottom wall 6 of the lower case 4 is provided with a second guide section 47, which guide section 47 is a recess located on a level above the bottom wall 6 of the lower case 4. An upper surface of the first guide section 46 and a lower surface of the second guide section 47 are respectively provided with guide grooves 46a, 47a extending along the right lateral side surface of the base unit 2. Rear ends of the guide grooves 46a, 47a are located adjacent to the rear edge of the loading port 35 and open at the rear surface of the base unit 2.

The loading port 35 is provided with a synthetic resin cover 50 which is fitted to the base unit 2 in such a manner that it is slidable between a position for closing the loading port 35 and a position for exposing the loading port 35. The cover 50 comprises a rectangularly parallelepipedic main wall 51 whose plan view corresponds to that of the loading port 35, a lower wall portion 52 extending from the lower edge of the main wall 51 and an upper wall portion 53 extending from upper edge of the main wall 51. The lower wall portion 52 and the upper wall portion 52 are bent from the main wall 51 in such a manner that they are oppositely located and face each other. The cover 50 of this embodiment also comprises a rear wall portion 56 extending from the rear edge of the main wall 51 and connecting the lower and upper wall portions 52, 53.

As shown in FIG. 5, the upper wall portion 53 of the cover 50 is slidably mounted on the first guide section 46 of the upper case 5. The upper wall portion 53 is provided on its surface facing the first guide section 46 with guide projections 55a, 55b which are slidably engaged with the guide groove 46a. The lower wall portion 52 of the cover 50 is slidably mounted under the second guide section 47 of the lower case 4. The lower wall portion 52 is provided on its surface facing the second guide section 47 with a projection 54 which is slidebly engaged with the guide groove 47a. While the guide projection 54 extends substantially over the entire length of the lower wall portion 52, the guide projections 55a, 55b of the upper wall portion 53 are arranged respectively at a front section and at a rear section of the upper wall portion 53 as shown in FIG. 3.

The cover 50 is slidebly pushed onto the loading port 35 from the rear side of the base unit 2. As the cover 50 is pushed, the guide projections 54 and 55a, 55b slidebly come into engagement with the respective guide grooves 46a and 47a so that the upper wall portion 53 overlaps the first guide section 46 of the upper case 5 and the lower wall portion 52 overlaps the second guide section 47 of the lower case 4. Thus, when the cover 50 is fitted to the base unit 2, it extends onto the top wall 10 of the upper case 5 and the bottom wall 6 of the lower case 4 and slidable between an open position where it entirely exposes the loading port 35 and a closed position where it completely closes the loading port 35 and hides the battery pack 30 as it is guided along the guide grooves 46a, 47a. When the cover 50 is moved to its closed position, an outer surfaces of the main wall 51, the lower wall portion 52, the upper wall portion 53 and the rear wall portion 56 are evenly connected to the respective outer surfaces of the right lateral wall, the bottom wall, the top wall and the rear wall of the base unit 2 so that the base unit 2 shows perfectly smooth outer surfaces.

As shown in FIGS. 3 and 5, the main wall 51 of the cover 50 is provided on the inner surface facing the loading port 35 with a support projection 60 that goes under the first guide section 46. The support projection 60 extends in parallel with the upper wall portion 53 and is disposed between front and rear guide projections 55a, 55b. The first guide section 46 is sandwiched by the support projection 60 and the upper wall portion 53 of the cover 50 when the loading port 35 is closed by the cover 50.

As shown in FIG. 3, the main wall 51 is provided at its front edge with an inwardly projecting flange 61. The flange 61 is in turn provided with a forwardly projecting hook member 62. The hook member 62 catches the side wall 7 of the lower case 4 when the cover 50 is slidably moved to its closed position. Again, the main wall 51 is provided at its rear portion with a latch 63. The latch 63 can be slidebly moved up and down with a finger of the operator. The latch 63 is removably hooked to a projection 64 disposed at the rear portion of the loading port 35 to lock the cover 50 in its closed position when the cover 50 is moved to the closed position.

The latch 63 is constantly urged toward a position where it is hooked to the projection 64 by means of a spring (not shown).

As shown in FIGS. 3 and 4, there is provided a stopper metal fitting 65 at the rear end portion of the loading port 35. The stopper metal fitting 65 is located above the projection 64. The stopper metal fitting 65 is realized by bending a thin metal plate twice to produce a elastically deformable projection. The stopper metal fitting 65 is fitted to a support piece 66 disposed at the side plate 34b. The stopper metal fitting 65 catches the flange 61 of the cover 50 when the cover 50 is moved to its open position to prevent the cover 50 from moving further away. If the cover 50 is forcibly moved further away from the position where the stopper metal fitting 65 catches the flange 61, the stopper metal fitting 65 is elastically deformed by the force applied thereto by the flange 61, which then overrides the stopper metal fitting 65 until the cover 50 is removed from the base unit 2.

Figure 13:
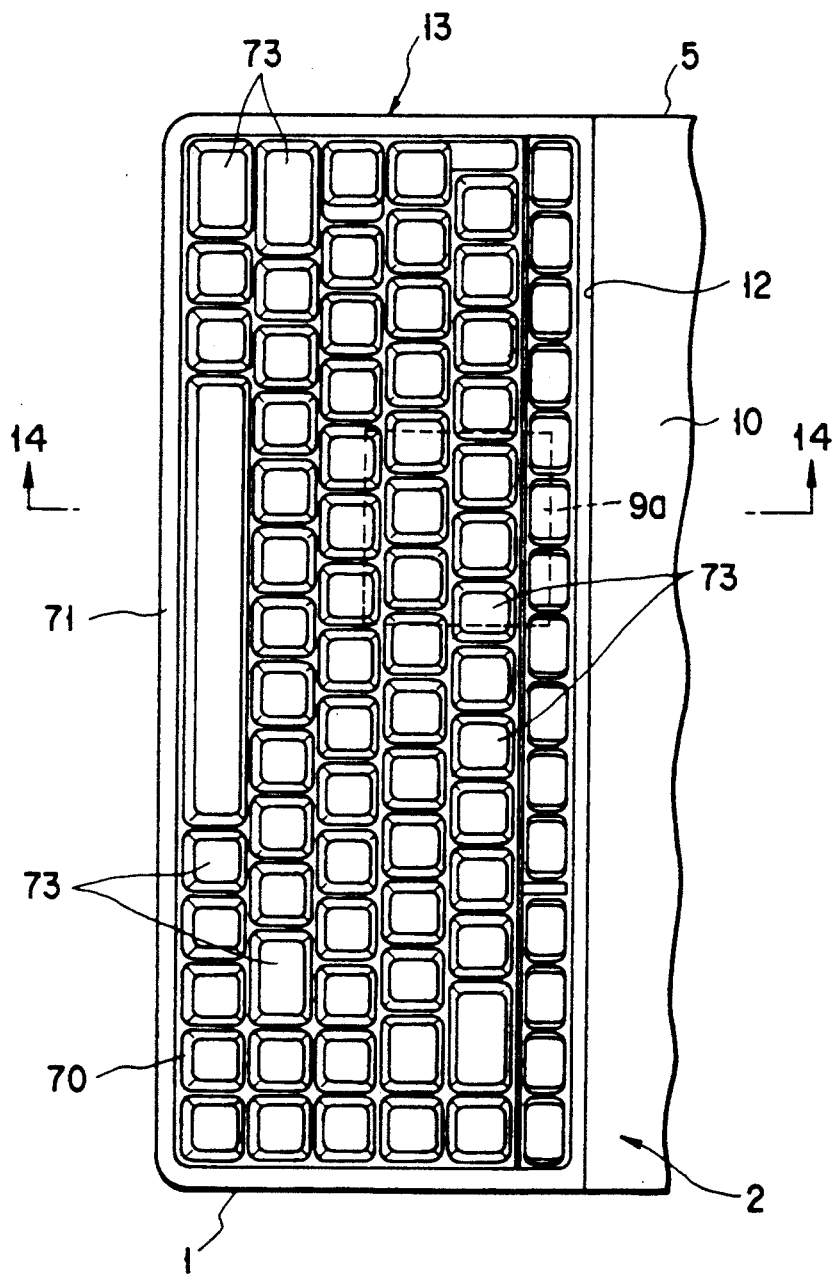
FIG. 13 is a plan view of a keyboard unit of the personal computer

Meanwhile, the keyboard unit 13 comprises a keyboard 70 and a keyboard frame 71 surrounding the keyboard 70 as shown in FIGS. 13 and 14. The keyboard 7 comprises a keyboard body 72 made of synthetic resin. The keyboard body 72 is rectangularly parallelepipedic and sized to fit into the opening of the receiving section 12 of the base unit 2. The keyboard body 72 comprises flat upper and lower surfaces. A large number of button keys 73 are arranged in a matrix on the upper surface of the keyboard body 72. A film 75 is laid under the lower surface of the keyboard body 72. Circuit patterns (not shown) are printed on the film 75 for electrically connecting or disconnecting each of the button keys 73 with the printed-circuit board 8. Therefore, the circuit patterns are electrically connected to the printed-circuit board 8 by way of a flexible connector board (not shown).

The keyboard body 72 is reinforced by an aluminum reinforcing plate 74. The reinforcing plate 74 has a size approximately equal to that of the keyboard body 72 in plan view and is laid right below the keyboard body 72 with the film 75 interposed therebetween. The reinforcing plate 74 serves to prevent switching noises generated by the use of the keys from leaking into the base unit 2 as well as to reinforce the keyboard body 72. The reinforcing plate 74 is exposed to the inner space of the base unit 2 through the opening of the receiving section 12.

A boss 76 projects downward from the front end of the lower surface of the keyboard body 72. A stay 77 projects downward from the front end of the reinforcing plate 74 in such a manner that its front end is exactly placed under the front end of the boss 76. The boss 76 and the stay 77 are secured to a seat section 78 arranged on the bottom wall 6 of the lower case 4 by means of a screw 79.

The keyboard frame 71 is engaged with the peripheral section of the keyboard body 72 and that of the reinforcing plate 74 so that it is integral with the keyboard 70. The keyboard frame 71 is removedly engaged with the receiving section 12 to securely hold the keyboard 70 to the receiving section 12.

The base unit 2 is provided between the keyboard unit 13 and the front half portion of the lower case 4 with an extended space 80 for accommodating optional devices including a MODEM unit for telecommunication. A MODEM case 81 made of synthetic resin is provided in the extended space 80. As shown in FIG. 12, the MODEM case 81 is disposed on the printed-circuit board 8 and adjacent to the heat emitting IC chip 9a. The extended space 80 is covered by a metal shield plate 82. The shield plate 82 is held to the MODEM case 81 and secured to the printed-circuit board 8 by means of a screw. The shield plate 82 comprises a portion 82a that extends from a main portion of the shield plate 82 to directly cover the IC chip 9a disposed adjacent to the MODEM case 81, The shield plate 82 comprises an upper surface that faces the keyboard unit 13 and is kept in close contact with the reinforcing plate 74.

Figure 16:
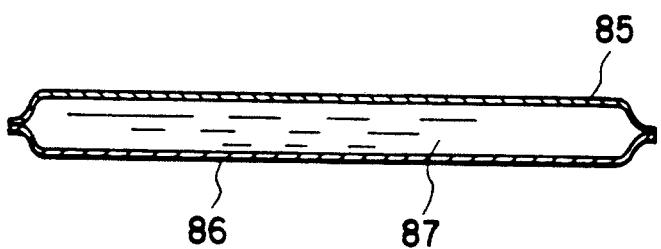
FIG. 16 is a sectional view of the heat sink of the embodiment of FIG. 13.

A heat sink 85 is arranged between the shield plate 82 and the IC chip 9a for cooling the heat emitting IC chip 9a. As shown in FIG. 16, the heat sink 85 comprises a bag 86 made of a laminated film and a liquid refrigerant 87 such as perfluorocarbon liquid airtightly contained in the bag 86 and realized in the form of a thin and soft sheet. The heat sink 85 is held in close contact with the lower surface of the shield plate 82 and an upper surface of the IC chip 9a. Due to this close contact, the heat emitted by the IC chip 9a flows into the liquid refrigerant 87 through the bag 86. Since there is a temperature gap between the portion of the heat sink 85 that contacts with the shield plate 82 and the portion that contacts with the IC chip 9a, the liquid refrigerant agent 87 in the bag 86 is subjected to natural convection that conveys the heat of the IC chip 9a to the shield plate 82. Since the shield plate 82 is in contact with the reinforcing plate 74, the heat of the IC chip 9a is eventually transmitted to the reinforcing plate 74 having a large surface area, which in turn discharges the heat.

A personal computer 1 having a configuration as described above has the following advantages.

The cover 50 for closing or opening the loading port 35 is provided with an upper wall portion 53 laid on the first guide section 45 of the upper case 5 and a lower wall portion 52 laid under the second guide section 47 of the lower case 4. The guide projections 54 and 55a, 55b of the wall portions 52 and 53 are slidably engaged with the respective guide grooves 46a and 47a.

With such an arrangement, the top wall 10 of the upper case 5 and the bottom wall 6 of the lower case 4 are coupled together by means of the cover 50. Therefore, if the top wall 10 of the upper case 5 and the bottom wall 6 of the lower case 4 tend to deflect and move away from each other, such deflection can be suppressed by the cover 50.

More specifically, since the hinge device 21 for rotatably supporting the display unit 3 is connected to the display mounting portion 14 disposed on the top wall 10, any force applied to the display unit 3 to rotate it can be transmitted to the thin top wall 10, which then can be vertically deflected, if slightly, at and near the upper edge of the loading port 35. Moreover, since the battery pack 30 normally has a considerable weight, the weight of the battery pack 30, when loaded, can affect the bottom wall 6 of the lower case 4 in such a manner that the bottom wall 6 may be deflected, if slightly, downward at and near the lower edge of the loading port 35.

With the arrangement as described above, however, the bottom wall 6 and the top wall 10 are coupled together by means of the cover 50 on the loading port 35 so that, if the walls 6 and 10 tend to be deflected for any reason, such deflection can be effectively suppressed by the cover 50 on the loading port 35. In other words, the cover 50 acts as a reinforcing member for the upper and lower cases 4 and 5.

Thus, because the upper and lower cases 4 and 5 do not require any additional reinforcement, the cases can have a simple structure to reduce their weight and cost. Moreover, as the upper and lower cases 4 and 5 are free from deformation, the cover 50 would not come off from the base unit 2 and can be moved smoothly for closing or opening the loading port 35.

The cover 50 is also provided with a support projection 60, which sandwiches the first guide section 46 of the with the upper wall portion 53. Thus, when the battery pack 30 is taken out of the battery storage portion 28 and, therefore, the top wall 10 is not supported by the battery pack 30 from inside any more, the support projection 60 effectively prevents the top wall 10 from deflecting downward so that the cover 50 operates as an effective reinforcing member for the upper case 5.

Additionally, the ridge 38 is provided along the case 36 of the battery pack 30 for containing a temperature sensor 49 and a temperature fuse 40 and a corresponding recess 44 is formed on the battery holder 32 for holding the battery pack 30 in order to engagedly receive the ridge 38. With such an arrangement, the ridge 38 interferes with the battery pack 30 and prevents the battery pack 30 from entering the battery storage portion 28 unless the ridge 38 and the recess are correctly aligned and, therefore, the battery pack 30 can always be introduced correctly into the battery storage portion 28.

Any incorrect insertion of the battery pack 30 into the battery storage portion 28 and consequent electric connection between the battery pack 30 and the computer 1 may be prevented alternatively by arranging the power supply terminal plates 41a, 41b and the terminal plates 42a, 42b of the battery pack 30 off from the center of the battery pack 30. With such an arrangement, to be sure, the power supply terminal plates 41a, 41b and the terminal plates 42a, 42b would not come into contact with the corresponding respective terminals of the battery storage portion 28 unless the battery pack 30 is correctly introduced into the battery storage portion 28 and, therefore, any incorrect electric connection between the battery pack 30 and the computer 1 can be effectively avoided. However, when as many as four terminal plates 41a, 41b, 42a, 42b are arranged on a narrow surface area of the end surface 36e of the slender case 36, they can hardly be disposed off from the center of the end surface 36e because of the small available surface area.

Therefore, it may be understood that the proposed provision of the ridge 38 on the side surface 36c of the battery pack 30 is a very effective way of preventing the battery pack 30 having four terminal plates 41a, 41b, 42a, 42b arranged on the narrow end surface 36e of its case 36 from being incorrectly introduced into the battery storage portion 28.

It should be noted that the inside of the ridge 38 is used to contain the temperature sensor 39 and the temperature fuse 40. This means that it is not necessary to have a device which is exclusively used for prevention of incorrect insertion of the battery pack 30 and, therefore, the overall structure of the battery pack 30 can be simplified.

Since the internal area for containing a number of nickel-cadmium batteries 37 and the area for storing the temperature sensor 39 and the temperature fuse 40 of the battery pack 30 are separated from each other, these components can be arranged within the case 36 in a neat and orderly manner.

On the other hand, the computer 1 comprises the heat sink 85 airtightly containing the liquid refrigerant 87 such as perfluorocarbon and disposed between the IC chip 9a that emits heat at an enhanced rate and the shield plate 82. With such an arrangement, the heat emitted from the IC chip 9a is conveyed to the reinforcing plate 74 of the keyboard unit 13 by way of the shield plate 82, utilizing natural convection of the liquid refrigerant 87 in the heat sink 85 so that the heat may be eventually discharged to the atmosphere.

Thus, an IC chip 9a that emits heat at an enhanced rate can be cooled in a highly reliably manner without using an additional cooling system such as a fan although the base unit 2 is made of synthetic resin that poorly transmits heat. With such a method of cooling the heat emitting IC chip 9a, the computer 1 is realized by using a limited number of components and is free from problems that can be caused by a cooling system including possible malfunction and noise of the fan.

The reinforcing plate 74 to which heat is transmitted from the IC chip 9a is located below the keys 73 and, therefore, isolated from the fingers of the operator. Thus, if the reinforcing plate 74 acts as a heat radiator, the operator will never feel the heat irradiated by the reinforcing plate 74 and can use the keys 73 without experiencing any discomfort due to the heat of the reinforcing plate 74.

It may be needless to say that the present invention is not limited to the above described embodiments, which may be modified within the scope of the invention.

For instance, the component that is be replaceably loaded into the base unit is not limited to a battery pack and may be replaced by a modular hard disc drive device.

While the battery holder is provided with a stopper metal fitting that holds the cover in its open position, it may alternatively be provided with an elastically deformable stopper claw which is integral with the battery holder and abuts the surface of the flange of the cover.

While the present invention is described by way of a book-sized personal computer, it can be applied to any other small electronic apparatuses such as a word processor.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electronic apparatus comprising:
   a box-shaped base unit having an upper case having a top wall and a peripheral wall continuous to the top wall, a lower case having a bottom wall and a peripheral wall continuous to the bottom wall, and a storage space between said upper case and said lower case, the peripheral walls of said upper case and said lower case having a loading port communicating with said storage space, the top wall of the said upper case having a first guide section continuous with an upper edge of said loading port, the bottom wall of said lower case having a second guide section continuous with a lower edge of said loading port;
   a component removably stored in said storage space through said loading port; and
   a cover attached to said base unit and capable of moving between a first position where said cover closes said loading port and a second position where said cover opens said loading port, said cover comprising a top wall portion slidably fitted on an upper surface of said first guide section, and a lower wall portion slidably fitted on a lower surface of said second guide section, said first and second guide sections of said base unit being clamped by said cover.

2. The electronic apparatus according to claim 1, wherein said cover has an outer surface which forms a part of the outer surface of the peripheral walls of said top and bottom cases when said cover is slid to the first position.

3. The electronic apparatus according to claim 1, wherein the top wall of said cover has a top surface located flush with the top surface of said upper case, and the lower wall of said cover has a lower surface located flush with the lower surface of said lower case.

4. The electronic apparatus according to claim 3, wherein said first and second guide sections include grooves formed in said upper surface of said first guide section and said lower surface of said second guide section, respectively, so as to extend in the moving direction of said cover.

5. The electronic apparatus according to claim 4, wherein the top wall portion of said cover has guide projections slidably placed in the groove of said first guide section, and the lower wall portion of said cover has a guide projection slidably placed in the groove of said second guide section.

6. The electronic apparatus according to claim 1, wherein said cover comprises a projection extending into said loading port, such that the top wall of said upper case is sandwiched between the projection and said the top wall of said cover.

7. The electronic apparatus according to claim 1, further comprising a locking mechanism for locking said cover at the the first position, and said locking mechanism having a latch which is capable of hooking said base unit when operated with a finger of an operator.

8. The electronic apparatus according to claim 1, further comprising a stopper mechanism for holding said cover at the second position, said stopper mechanism having a first engaging member fastened to said cover, and a second engaging member fastened to said base unit and capable of engaging with the first engaging member.

9. The electronic apparatus according to claim 1, wherein said base unit comprises a front half portion having a keyboard device and a rear half portion having a flat-panel type display unit, said display unit is rotatably connected to said base unit and capable of moving between a keyboard covering position where said display unit covers said keyboard device and a keyboard-opening position where said display unit stands upright behind said keyboard device.

10. The electronic apparatus according to claim 9, wherein said upper case further comprises a hollow ridge protruding upwards from the top wall, and a hinge device located in said hollow ridge and connecting said display unit rotatably to said upper case, and said hinge device being positioned near said loading port.

11. The electronic apparatus according to claim 10, wherein reinforcing ribs are connected to the inner surface of the top wall of said upper case and located near said hinge device and said loading port.

12. The electronic apparatus according to claim 11, wherein a reinforcing plate is set in contact with the tops of said ribs, thereby holding the top wall of said upper case from within, said reinforcing plate having a leg secured to said hollow ridge along with said hinged device.

13. An electronic apparatus according to claim 10, wherein said hollow ridge of said upper case has an extension portion positioned above an end portion of said first guide section, and said cover is clamped by said extension portion and said first guide section.

14. The electronic apparatus according to claim 1, wherein said component is a battery pack which functions as a drive power supply and comprises a rectangular case and a number of batteries contained in the rectangular case, said rectangular case having a flat bottom wall, a flat top wall, a pair of opposing side walls connecting the bottom wall and the top wall, and a pair of opposing end walls connecting the bottom wall and the top wall.

15. The electronic apparatus according to claim 14, wherein said rectangular case has a hollow ridge secured to one of said side walls, extending in a lengthwise direction of said rectangular case, and containing a temperature sensor for detecting the temperature of said battery pack and a temperature fuse.

16. The electronic apparatus according to claim 15, wherein said rectangular case has positive and negative power-supply terminal plates connected to said batteries, and a pair of terminal plates connected to said temperature sensor, and said terminal plates are arranged in a line on one of end walls.

17. The electronic apparatus according to claim 14, wherein said base unit further comprises a battery holder holding said battery pack, contained in said storage space, and comprising a bottom plate on which the bottom wall of said rectangular case is slidably mounted, and a pair of guiding side walls on which the side walls of said case are slidably mounted and guided, one of of said guiding side walls having a recess for receiving said hollow ridge of said rectangular case.

18. An electronic apparatus comprising:
 a housing having side walls and a battery pack storage portion which is positioned inside said side walls of said housing, and which has a pair of side walls opposite to each other, said side walls of said housing having a loading port continuous with said battery storage portion;
 a battery pack removably stored in said battery storage portion through said loading port, and having a pair of side walls slidably contacting with and guided by the side walls of said battery storage portion, and a hollow ridge secured to one of said side walls, extending in a direction in which said battery pack is inserted into said battery storage portion, and containing circuit components; and
 a recess formed in one of the side walls of said battery storage portion for receiving said hollow ridge of said rectangular case when said battery pack is inserted into said battery storage portion, said recess having an opening communicating with said loading port.

19. The electronic apparatus according to claim 18, wherein said housing further comprises a cover for opening and closing said loading port.

20. The electronic apparatus according to claim 19, wherein said cover is in the same plane as one side of said housing and forms part of the side thereof when it closes said loading port.

21. The electronic apparatus according to claim 19, wherein said cover is slidably mounted on said housing and capable of moving between a port opening position where said cover opens said loading port and a port-closing position where said cover closes said loading port.

22. An electronic apparatus comprising:
 a base unit having an upper case having a top wall and a side wall continuous to the top wall and a rear wall continuous to the top and the side walls, a lower case having a bottom wall and a side wall continuous to the bottom wall and a rear wall continuous to the top and side walls, and a storage space between said upper case and lower case, the side walls of said upper and lower cases having a loading port communicating with said storage space, the top wall of said upper case having a first guide section continuous with an upper edge of said loading port, the bottom wall of said lower case having a second guide section continuous with a lower edge of said loading port, and said first and second guide sections have grooves, respectively, which extend in the direction of said upper and lower edges of said loading port;
 a component removably stored in said storage space through said loading port; and
 a cover attached to said base unit and capable of moving between a first position where said cover closes said loading port and a second position where said cover opens said loading port, said cover comprising a top wall portion slidably fitted on an upper surface of said first guide section, and a lower wall portion having a guide projections slidably placed in the groove of said first guide section, said lower wall portion having a guide projection slidably placed in the groove of said second guide section, and said first and second guide sections of said base unit being clamped by said cover.

23. The electronic apparatus according to claim 22, wherein an end portion of said groove of said guide section and an end portion of said groove of said guide section are open in said rear wall of said upper case and said rear wall of said lower case, respectively.

24. The electronic apparatus comprising:
 a base unit having an upper case having a top wall and a side wall continuous to the top wall and a rear wall continuous to the top and side walls, a lower case having a bottom wall and a side wall continuous to the bottom wall and a rear wall continuous to the top and side walls, and a storage space between said upper case and said lower case, the side walls of said upper and lower cases having a loading port communicating with said storage space, the top wall of said upper case having a first guide section continuous with an upper edge of said loading port, the bottom wall of said lower case having a second guide section continuous with a lower edge of said loading port,
 a component removably stored in said storage space through said loading port; and
 a cover attached to said base unit and capable of moving between a first position where said cover closes said loading port and a second position where said cover opens said loading port, said cover comprising a top wall portion slidably fitted to an upper surface of said first guide section, a lower wall portion slidably fitted on a lower surface of said second guide section, a rear wall portion communicating with said rear walls of said top and lower cases, and a latch formed at an end portion of said cover which is situated opposite to said rear wall portion of said cover, said being capable latch of being removably engaged with said base unit to hold said cover in said first position, and said first and second guide sections of said base unit being clamped by said cover.

25. The electronic apparatus according to claim 24, wherein said first and second guide sections include grooves formed in said upper surface of said first guide section and said lower surface of said second guide section, respectively, so as to extend in the moving direction of said cover.

26. The electronic apparatus according to claim 24, wherein an upper end portion of said groove of said first guide section and an end portion of said groove of said second guide section are open in said rear wall of said upper case and said rear wall of said lower case, respectively.

27. The electronic apparatus according to claim 26, wherein said rear wall portions of said cover covers said end portions of said first and second guide sections when said cover is located in said first position.

* * * * *